E. C. KING.
METHOD OF REDUCING ORES.
APPLICATION FILED OCT. 23, 1920.
1,425,386.
Patented Aug. 8, 1922.
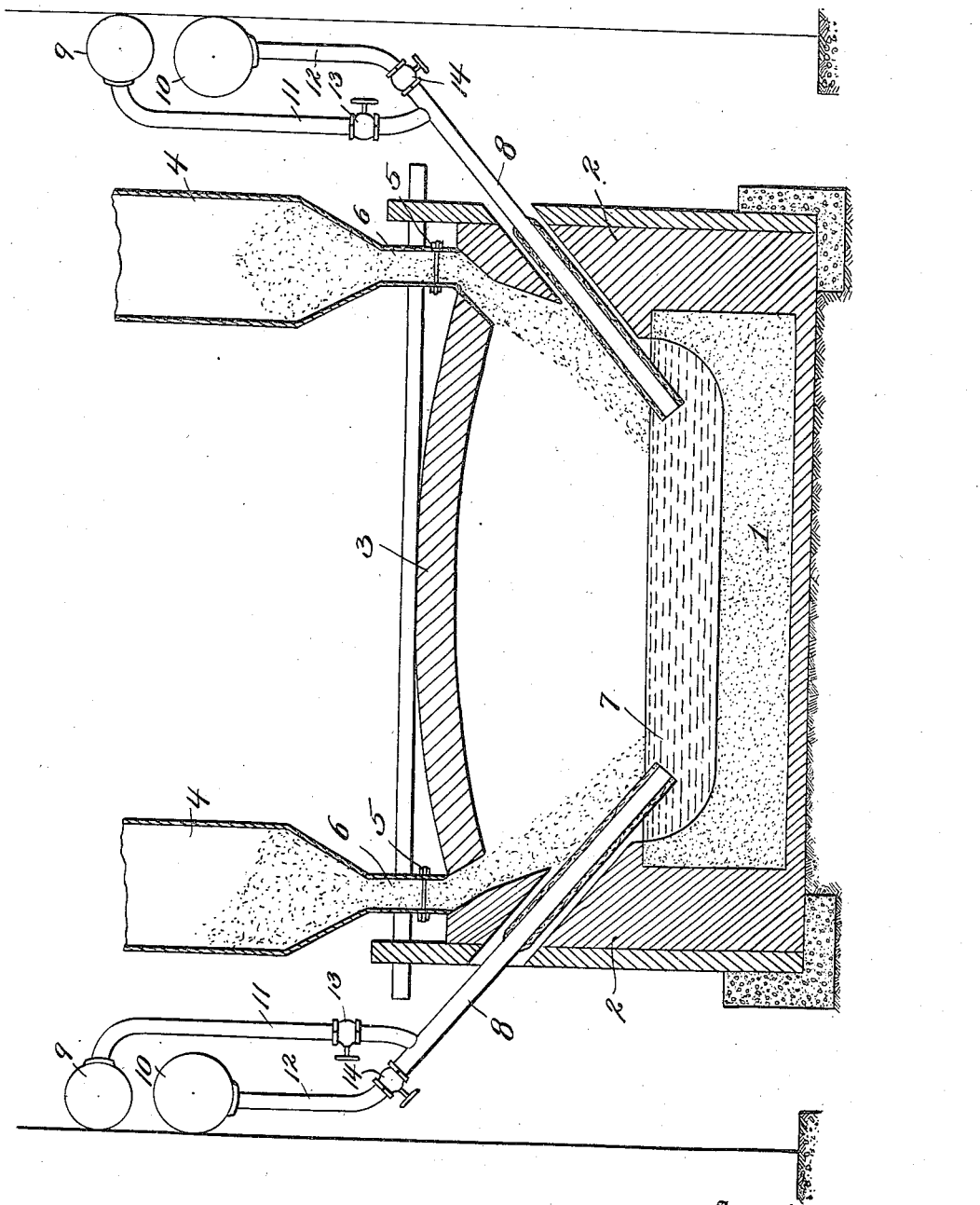

UNITED STATES PATENT OFFICE.

EDWARD C. KING, OF LOS ANGELES, CALIFORNIA.

METHOD OF REDUCING ORES.

1,425,386.     Specification of Letters Patent.     Patented Aug. 8, 1922.

Application filed October 23, 1920. Serial No. 418,906.

*To all whom it may concern:*

Be it known that I, EDWARD CHARLES KING, a citizen of the United States, residing at Los Angeles, in the county of Los Angeles and State of California, have invented new and useful Improvements in Methods of Reducing Ores, of which the following is a specification.

This invention relates to the art of reducing metal-bearing ores and it provides a novel and improved method of economically reducing such ores and particularly sulphide ores, by utilizing the fuel value contained in the ore directly for the purpose of reducing the ore, thus producing the matte product desired.

In the method heretofore used for roasting sulphide ore, the fuel value contained in the ore is utilized in the operation. However, in the roasting operation, oxides of the metal are formed. For example, the sulphides of iron ($FeS_2$), are reduced to $Fe_2O_3$, and the copper sulphides ($Cu_2S$), are reduced to $CuO$, and $CuO-SiO_2$, and the roasted ore requires retreatment, all oxides formed in the roasting operation requiring heat for the reaction necessary, in the case of iron, to form $FeO$ for the slag and $FeS$ for the matte, and in the case of copper, to reduce to $Cu_2S$, to form matte in the smelting operation. The direct reduction of ores in the blast furnace by the method heretofore used, is wasteful of the fuel values contained in the ore, and a large percentage of external fuel is necessary. In pyrite smelting, one-half to five-eighths of the sulphur fuel value contained in the ore is lost, and the operation is limited with respect to the constituency of the resulting slag and the grade of matte produced.

The present invention provides a method that affords the broadest latitude that chemical combinations permit, in the formation of slags. Utilizing a molten bath of matte as the basis of the operation, the method provided by the present invention comprises injecting fuel such as liquid hydrocarbon, solid carbon such as pulverized coal, or other carbonaceous fuel, and air or other oxidizing agent, preferably under pressure, separately or in combination, into the molten bath of metal. The fuel supply is regulated to maintain the desired temperature, and the air supply is regulated for the combustion of such an amount of the sulphur, and the oxidation of such an amount of the metals as will produce the desired slag and matte from the varying constituents of the material charged. Owing to the high temperature of the furnace and the bath of metal, the contact of the oxygen contained in the air admitted with the sulphides contained in the charge, creates a spontaneous combustion of the sulphur and oxidation of the iron desired for the slag, generating heat with great rapidity and to a surprising degree. The matte bath being a good conductor of heat, it continually absorbs heat from the fuel furnished by the continuous sulphide charge. Using the standard fuel value of the combustion of sulphur and oxidation of iron, calculations determine, and it has been demonstrated in practice that no external fuel would be required for the reduction of an ordinary sulphide charge producing a forty-five per cent copper matte. The agitation created by the pressure of the fuel and air injected into the matte bath plays an important part in the operation, by disseminating the charge in order to take advantage of the entire bath, and to bring the basic and acid content of the charge into intimate contact to form slag and produce fresh matte for a continuous rapid fusion of the charge.

Apparatus of various kinds may be used in connection with my persent invention, it being understood that the invention is not limited to any particular kind of apparatus.

In the accompanying drawing I have shown a type of reverberatory matting furnace as an example of one capable of use in this connection. In the structure illustrated, 1 designates the bottom of the furnace, which may be of suitable neutral or basic material, 2 designates the side walls, and 3 the arch wall. Hoppers 4, which are adapted to contain the ore to be treated, are positioned above the furnace, the charge being admitted as required by means of valves 5 positioned in the outlets 6. 7 designates the molten bath of metal in the furnace. On opposite sides of the furnace 1 are inserted twyers 8 which are covered at their lower ends by any suitable refractory material and serve to introduce the fuel and other agents into the molten mass. The containers 9 and 10 for the fuel and compressed air respectively communicate with the twyers through pipes 11 and 12 which are provided with valves 13 and 14 through means of which the supply of either of these agents may be regulated. As illustrated in the drawing, the fuel may be introduced below the surface of the bath under pressure directly in contact with the molten metal, the charge falling from hoppers 4 onto the surface of the bath.

As the fuel is injected into the bath, the gases which are evolved escape in the usual manner and the slag which rises to the top of the bath flows off.

The method provided by the present invention possesses important and substantial advantages over methods heretofore used. It affords the broadest latitude that chemical combinatons will permit in the formation of slags, it utilizes the fuel value contained in the ore, except the amount required to form the desired matte, directly for the reduction of the ore, it takes advantage of the matte bath, first to agitate and disseminate the charge, causing intimate contact of the bases and acids, resulting in a most rapid fusion of the charge, and it then takes advantage of the power of the matte bath to conduct heat and at the same time give up heat to assist in the fusion of the continuous charge. Furthermore, it avoids rehandling and retreatment of the material, and in consequence, the metal losses associated therewith, to which all present methods are subjected, a part of the heat generated from the fuel value contained in the ore may be recovered to generate steam, it reduces the volume of poisonous gases discharged into the atmosphere, which is a serious objection to present methods, and it provides a novel and simple means of reducing sulphide ores, which effects a great economy, as compared with present methods.

Hydrocarbon is injected into a bath of metal for the purpose of deoxidizing the metal in my prior process of refining copper, as is set forth in U. S. Letters Patent No. 1,183,736 granted to me on May 16, 1916, and furthermore, air is used in the refining of metals. The present invention is a distinct and novel method for the direct smelting or reduction of sulphide ores, which possesses distinguishing features and advantages such as those hereinbefore set forth.

I claim:—

1. The hereindescribed method of reducing metal ores which comprises introducing an oxidizing agent and carbonaceous material into the interior and below the surface of a molten bath of metal produced from such ore, and concurrently feeding ore to be reduced to the surface of such bath.

2. The hereindescribed method of reducing sulphide ores which comprises introducing an agitating and oxidizing agent under pressure and a carbonaceous material into the interior and below the surface of a molten bath of metal produced from such ore, and concurrently supplying ore to be reduced to the surface of such bath.

3. The hereindescribed method of reducing metal ores which consists in introducing an agitating and oxidizing agent under pressure together with hydrocarbon oil into the interior and below the surface of a molten bath of metal produced from such ore, and concurrently supplying ore to the surface of such bath.

4. The hereindescribed method of reducing sulphide ores which comprises injecting a carbonaceous substance and an oxidating agent to the interior and below the surface of a molten bath of metal produced from such ore, and concurrently supplying such ore to the bath.

5. The hereindescribed method of reducing sulphide ores which comprises injecting a carbonaceous substance and an oxidating agent into the interior and below the surface of a molten matte bath produced from such ore to burn such an amount of the sulphur and to oxidize such an amount of the metals therein as will produce the desired slag and matte.

6. The hereindescribed method of reducing ores and concentrates, including oxides and carbonates in combination with sulphides, which comprises introducing carbonaceous substance and oxidizing agents, injected separately or in combination to the interior and below the surface of the molten bath of metal produced from such ore, and concurrently supplying such ore to the bath.

7. The hereindescribed improvement in the method of reducing ores and concentrates to effect a combined smelting and converting operation, which comprises utilizing sulphur fuel value contained in the ore, heat generated by the oxidation of the metals, and heat generated by the combination of the iron sulphide with the copper sulphide, in conducting such combined smelting and converting operation.

In testimony whereof I have hereunto set my hand in presence of two subscribing witnesses.

EDWARD C. KING.

Witnesses:
GEORGE R. WOODIN,
S. E. STEVEN.